United States Patent
Safaei

(10) Patent No.: US 9,531,583 B2
(45) Date of Patent: Dec. 27, 2016

(54) SYSTEM, METHOD AND SOFTWARE APPLICATION FOR THE DISSEMINATION OF DATA ACROSS A PLURALITY OF COMPUTING SYSTEMS

(75) Inventor: Farzad Safaei, Mount Keira (AU)

(73) Assignee: iSee VC Pty Ltd, New South Wales (AU)

( * ) Notice: Subject to any disclaimer, the term of this patent is extended or adjusted under 35 U.S.C. 154(b) by 951 days.

(21) Appl. No.: 13/579,880

(22) PCT Filed: Feb. 18, 2011

(86) PCT No.: PCT/AU2011/000172
§ 371 (c)(1),
(2), (4) Date: Oct. 26, 2012

(87) PCT Pub. No.: WO2011/100799
PCT Pub. Date: Aug. 25, 2011

(65) Prior Publication Data
US 2013/0205046 A1    Aug. 8, 2013

(30) Foreign Application Priority Data

Feb. 18, 2010    (AU) ................................. 2010900683

(51) Int. Cl.
| | | |
|---|---|---|
| *H04L 12/24* | (2006.01) | |
| *G06F 9/50* | (2006.01) | |
| *H04L 29/08* | (2006.01) | |
| *H04L 29/06* | (2006.01) | |

(52) U.S. Cl.
CPC ............ *H04L 41/04* (2013.01); *G06F 9/5061* (2013.01); *H04L 67/104* (2013.01); *H04L 67/1053* (2013.01); *H04L 67/38* (2013.01)

(58) Field of Classification Search
CPC ...... H04L 41/04; H04L 67/38; H04L 12/1854; H04L 45/00; H04L 45/16; H04L 67/1042; H04L 9/0836; A63F 2300/5553; H04Q 2011/0096
See application file for complete search history.

(56) References Cited

U.S. PATENT DOCUMENTS

| | | | |
|---|---|---|---|
| 5,079,767 A * | 1/1992 | Perlman | .......................... 370/408 |
| 5,841,980 A | 11/1998 | Waters et al. | |
| 7,154,861 B1 | 12/2006 | Merchant et al. | |
| 8,026,918 B1 * | 9/2011 | Murphy | ................. G06N 3/006 345/473 |
| 8,403,751 B2 * | 3/2013 | Boustead | ................ A63F 13/12 463/35 |

(Continued)

OTHER PUBLICATIONS

International Search Report for International App. No. PCT/AU2011/000172, mailed on Apr. 28, 2011 (in 3 pages).

(Continued)

*Primary Examiner* — Vivek Srivastava
*Assistant Examiner* — Muhammad Raza
(74) *Attorney, Agent, or Firm* — Knobbe, Martens, Olson & Bear, LLP

(57) ABSTRACT

A method for transferring data between computing systems, comprising the steps of for a plurality of computing systems, dividing the plurality of computing systems into at least two virtual zones, and, for each of the plurality of computers within each virtual zone, utilizing an algorithm to determine the manner in which the computers should be linked.

2 Claims, 7 Drawing Sheets

(56) References Cited

U.S. PATENT DOCUMENTS

| | | | |
|---|---|---|---|
| 2004/0143672 A1* | 7/2004 | Padmanabham | H04L 29/06027 709/231 |
| 2005/0063321 A1 | 3/2005 | Imai | |
| 2006/0187950 A1 | 8/2006 | Bou-Diab et al. | |
| 2006/0227774 A1* | 10/2006 | Hoenicke | H04L 45/00 370/389 |
| 2006/0245360 A1* | 11/2006 | Ensor | H04L 29/12207 370/238 |
| 2007/0013701 A1* | 1/2007 | Segawa | G06F 13/4022 345/502 |
| 2007/0110063 A1* | 5/2007 | Tang | H04L 45/02 370/390 |
| 2009/0252061 A1 | 10/2009 | Small et al. | |
| 2010/0049346 A1* | 2/2010 | Boustead | A63F 13/12 700/94 |
| 2010/0080120 A1* | 4/2010 | Bejerano | H04L 12/18 370/228 |
| 2010/0284309 A1* | 11/2010 | Allan et al. | 370/256 |
| 2011/0002333 A1* | 1/2011 | Karuppiah | H04L 12/1836 370/390 |

OTHER PUBLICATIONS

Dowlatshahi, et al. "Overlay Multicasting of Real-Time Streams in Virtual Environments." Proceedings of IEEE GLOBECOM 2006, IEEE, Nov. 2006, pp. 1-5.

Popescu, et al. "Stateless application-level multicast for dynamic group communication." Proceedings of the Eighth IEEE International Symposium on Distributed Simulation and Real-Time Applications, IEEE, Oct. 2004, pp. 20-28.

Sun, et al. "Awareness-Driven Media Stream Transmitting Framework of Virtual Tele-conferencing." Proceedings of 2002 IEEE Region 10 Conference on Computers, Communications, Control and Power Engineering, IEEE, Oct. 2002, vol. 2, pp. 846-849.

Examination Report issued Oct. 16, 2015 for Australian Patent Application No. 2011217741.

Supplementary European Search Report dated Oct. 30, 2012, issued in corresponding European Patent Appl. No. 11744196, with a filing date of Feb. 18, 2011.

* cited by examiner

SYSTEM, METHOD AND SOFTWARE APPLICATION FOR THE DISSEMINATION OF DATA ACROSS A PLURALITY OF COMPUTING SYSTEMS

RELATED APPLICATIONS

This application is a U.S. National Phase under 35 U.S.C. §371 of the International Patent Application No. PCT/US2011/000172, filed Feb. 18, 2011, and published in English on Aug. 25, 2011 as WO 2011/100799 A1, which claims the benefit of Australian Application No. 2010900683, filed Feb. 18, 2010, all of which are incorporated by reference in their entirety.

FIELD OF THE INVENTION

The present invention relates to a system, method and software application for the dissemination of data across a plurality of computing systems. The invention finds particular, but not exclusive, use in the area of peer to peer, multicasting and unicasting of data across a computing network.

BACKGROUND OF THE INVENTION

The recent burgeoning of social networking computing systems and multi-user virtual computer environments is creating a significant demand for multiperson-to-multiperson communication.

Currently, the communication tools available to virtual communities are limited to asynchronous communications (e.g. chat, email, messaging) or to telephony-style one-to-one interaction. While some work is being done in the area of "immersive communications", the area still requires significant work to overcome certain bandwidth limitations.

Immersive communications provide aural and visual scenes created for the user that are similar to his/her perceptions when mingling with a real crowd of people. For example, the voices of other people in the virtual crowd are spatially placed in the audio scene of the listener in perfect harmony with their respective virtual locations. Similarly, the videos of other participants are appropriately placed within the visual range of the viewer. Note that the term 'immersive' is not limited to the use of immersive display technology, such as Virtual Reality Head-Mounted Displays or Cave Automatic Virtual Environment (CAVE). The term 'immersive' is used broadly to refer to the availability of appropriate information within visual and aural scenes. In many scenarios, a simple monitor or even a hand-held display may be sufficient to provide an immersive experience.

Immersive multimedia communication is fundamentally a multipoint-to-multipoint communication system. The multimedia information generated by each user, such as his/her voice and video or user-generated content, must reach a subset of other participants in real time. This subset will change dynamically as a result of movements of users within the virtual crowd and is affected by the presence of barriers, walls and other virtual artifacts within the environment. It may also depend on the propagation characteristics of the media through the virtual environment. Sound, for example, may propagate through walls but visual information cannot.

There has been little research into the viability of multipoint to multipoint communication systems.

SUMMARY OF THE INVENTION

In a first aspect, the present invention provides a method for transferring data between computing systems, comprising the steps of, for a plurality of computing systems, dividing the plurality of computing systems into at least two virtual zones, and, for each of the plurality of computers within each Virtual zone, utilising an algorithm to determine the manner in which the computers should be linked.

In one embodiment, there is provided a method wherein the computers are linked utilising a tree structure. The tree structure may utilise one of the virtual and physical distance between computers as a metric. In another embodiment, the tree structure may utilise a combination of the physical and virtual distances between computers as a metric.

In a second aspect, the present invention provides a system for transferring data between computing systems, comprising, for a plurality of computing systems, means for dividing the plurality of computing systems into at least two virtual zones, and, for each of the plurality of computers within each virtual zone, utilising an algorithm means to determine the manner in which the computers should be linked.

In one embodiment, there is provided a system wherein the computers are linked utilising a tree structure. The tree structure may utilise one of the virtual distance or the physical distance between computers as a metric. In another embodiment, the tree structure may utilise a combination of the physical and virtual distances between computers as a metric.

In a third aspect, the present invention provides a method for transferring data between computing systems, comprising the steps of, determining the topology of a computing network comprising a plurality of computing systems, and utilising the topology to select an appropriate network formation algorithm.

In a fourth aspect, the present invention provides a computer program comprising at least one instruction which, when implemented on a computer readable medium of a computer system, causes the computer system to implement the method in accordance with the first or the third aspect of the invention.

In a fifth aspect, the present invention provides a computer readable medium providing a computer program in accordance with the third aspect of the invention.

In the context of the specification, the term "data" is intended to be construed broadly and include within its scope any block of arbitrary data that is utilisable by a computing system. Data may, for example, include multimedia files (e.g. audio files, video files, data files, etc.) or other information blocks, such as emails, instant messages, or any other self contained "piece" of information. Moreover, the data may be encoded or encrypted as required.

DETAILED DESCRIPTION OF THE DRAWINGS

Notwithstanding any other embodiments that may fall within the scope of the present invention, an embodiment of the present invention will now be described, by way of example only, with reference to the accompanying figures, in which.

DESCRIPTION OF PREFERRED/SPECIFIC EMBODIMENTS

In the description which follows an embodiment of the present invention is described in the context of a system and method for transferring any type of data between two or more computing systems, but particularly multimedia files, such as video and sound files (compressed or uncompressed), between two or more computers remotely connected over a communications network such as the Internet. However, it will be understood that the present invention is not limited to the example application described herein and is equally applicable to the transfer of any form of electronic file between any number and configuration of computing systems.

Figure 1A:
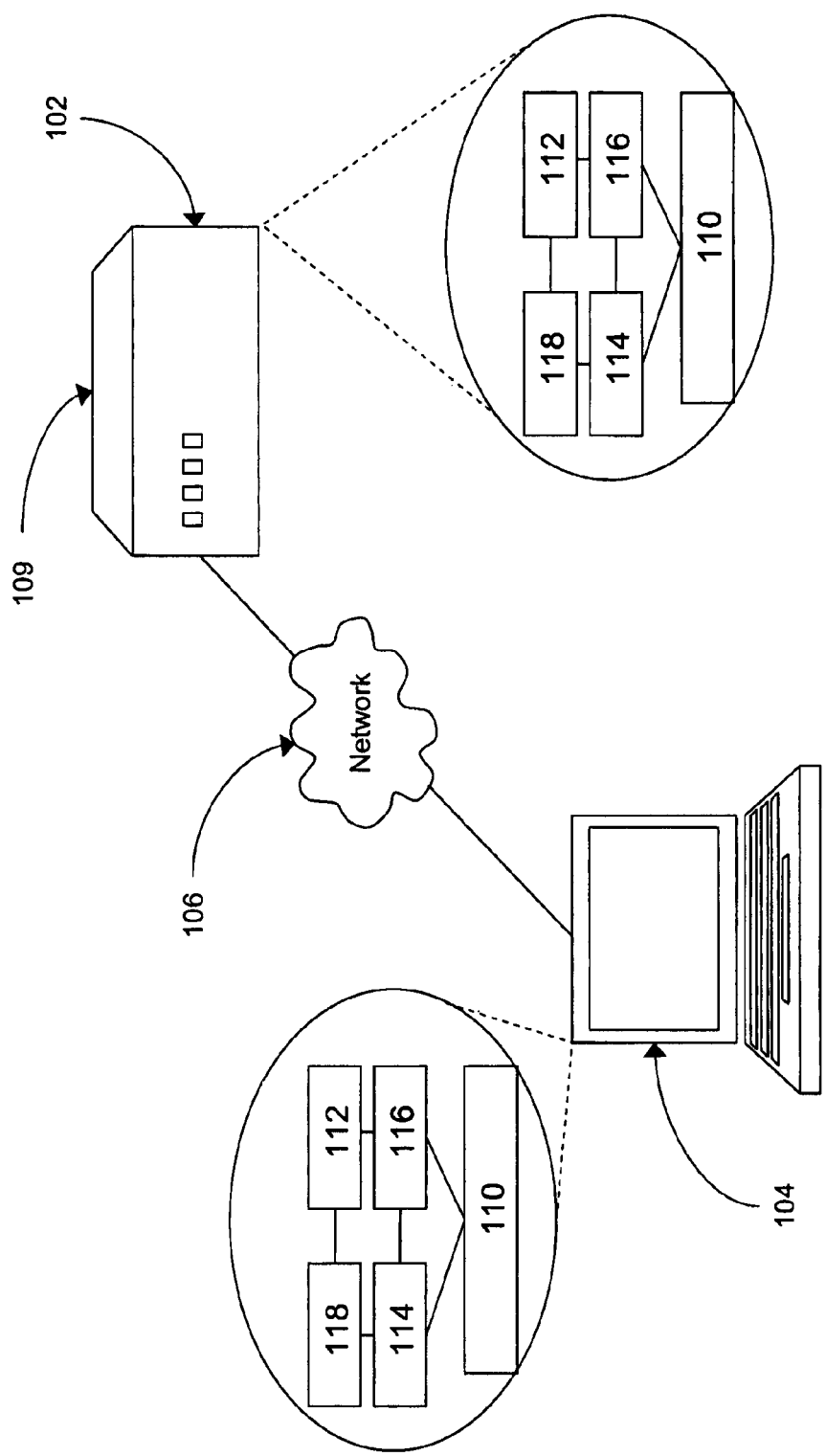
FIGS. 1A-1C are diagrams representing an example computing network for transferring data between computing devices, in accordance with an embodiment of the present invention.
Figure 1B:
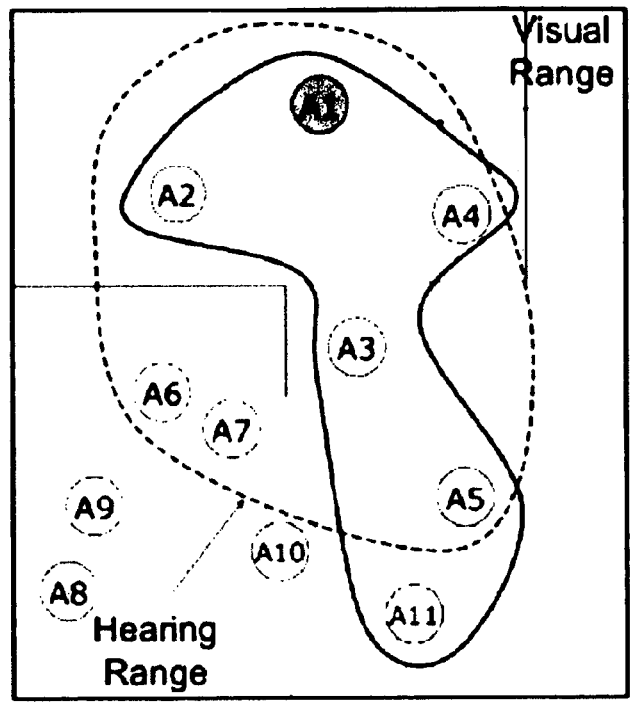

With reference to FIGS. 1A and 1B, data files are transferred between two or more computing devices in the form of one or more server computers 102, 104, respectively.

The computers 102, 104 are connected over a communications network in the form of a local or wide area network 106 and communicate using a packet-switched protocol, such as the TCP/IP protocol.

The computers 102, 104 each comprise appropriate computer hardware including a motherboard, central processing unit 110, random access memory 112, hard disk 114 and networking hardware 116. In addition to the hardware, the computers 102, 104 include an operating system (such as the Linux operating system, which can be obtained from the Internet from a number of providers, such as but not limited to websites located at URLs http://www.redhat.com, http://www.suse.com and http://www.ubuntu.com) that resides on the hard disk and which co-operates with the hardware to provide an environment in which the software applications can be executed.

The computers 102, 104 also include a receiving module 118 including standard software and hardware (such as a TCP/IP socket) for receiving (and transmitting) data files.

Figure 1C:
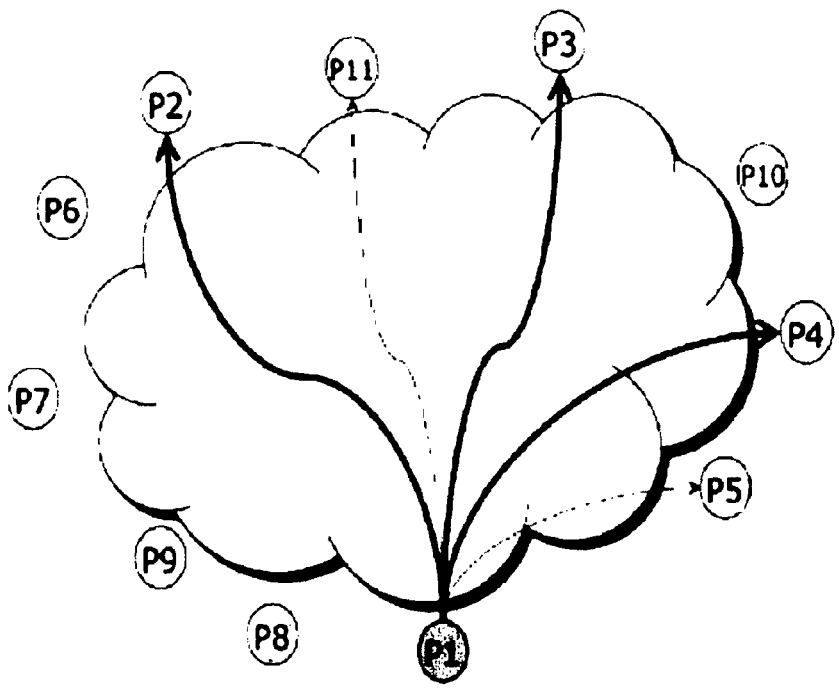

Referring now to FIGS. 1B and 1C, there are shown some example systems in more detail. In FIG. 1B a small portion of a virtual crowd is shown with numerals A1-A11 signifying the virtual representations (avatars) of peers P1-P11 respectively. P1-P11 form a peer-to-peer overlay network over the underlying Internet or Intranet, as shown in FIG. 1C.

Consider any member of this virtual crowd, say A1 corresponding to peer P1, and assume that the example is restricted to immersive voice and video communications. Dissemination of other types of media, such as gestures, haptics and user generated content would have similar but distinct requirements, so are not considered for the purpose of this example. The visual and hearing ranges of A1 are shown in FIG. 1B as areas enclosed by solid and dashed curves respectively.

Assuming symmetry (that is, each member of the virtual crowd A1-A11 can hear and see each other member A1-A11 unless there is a barrier between the members, such as a wall), the voice and video of P1 must somehow reach all the peers residing in these ranges for inclusion in their aural and visual scenes. This corresponds to P2-P7 for voice and P1 to P5+P11 for video. In addition, A5-A7 are further away from A1 and so, for these peers, A1's voice can be delivered with more delay and rendered with less spatial accuracy. Similarly, A3, A5 and A11 would be able to tolerate a lower resolution and frame rate for A1's video because of the larger virtual separation. These QoS (Quality of Service) variations, however, depend on the current arrangements in the virtual crowd and could change with the passage of time as the avatars A1-A11 move around in the virtual space.

In the absence of a native multicast support at the IP layer, a unicast model for dissemination of multipoint-to-multipoint content can be considered as shown in FIG. 1C. To avoid cluttering FIG. 1C, only the video distribution of P1 is shown. Each peer, however, has to unicast both voice and video to the subset of peers in its hearing or visual ranges. For the whole virtual crowd, therefore, mDN unicast flows are required on average, where m is the number of media types (e.g. voice and video), N is the number of participants, and the density D represents the average number of participants within the communication range of each peer. Focusing on P1 and assuming that r is the bit rate of video, the upload capacity required to distribute this peer's video will be rD on average. As discussed later, it is possible to reduce this by using some form of QoS differentiation among the video flows. Two possible coding techniques that could be used for this purpose are layered coding and multiple description coding. In both cases the unicast flow to peers who are further away in the virtual world would only contain a subset of video packets, which is shown as thinner arrows in FIG. 1C.

On the receiving side, each peer receives a number of unicast flows from everyone in its hearing and visual ranges.

On average, this download capacity will be the same as the upload capacity in the case of unicast distribution. Note, however, that while it is conceivable to reduce the upload capacity requirements by using some form of multicast scheme, the only avenue to reduce the download capacity is to employ QoS differentiation as discussed above.

If a native multicast support is available at the IP layer, then P1 only needs to send one video flow as a multicast flow, which would reduce the upload capacity requirements significantly. The IP multicast would also improve the efficiency of using the network transmission capacity by eliminating duplicate flows over the same links. Provided, a shortest path tree was used for multicast and ignoring the additional processing needed for multicast flow replication and routing, the latency experienced by each flow would be close to the unicast case. The download capacity, however, would remain the same, and indeed if the multicast did not provide QoS differentiation, it could worsen.

Peer-to-Peer Models for Multicast

There are three methods for creating peer-to-peer multicast for dissemination of content. In the ensuing description a single multicast tree for delivery of P1's video is used as an example. However, the multipoint-to-multipoint communication session would require mN overlay multicast trees and, on average, each peer would participate in 'mD+m' multicast connections either as the source, relay or leaf node and contribute to the overhead of formation and maintenance of these trees. Movements within the virtual crowd and churn (peers joining and leaving) would translate to changes in multicast trees. On average, virtual movement or churn of a participant would affect 'mD+m' multicast trees, which must be recalculated and communicated to other peers.

Figure 2A:
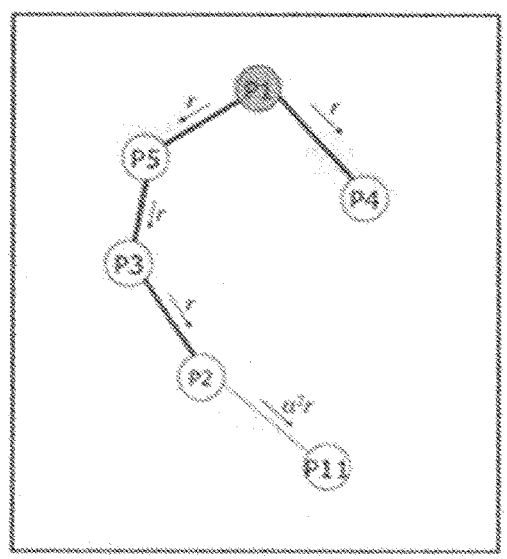
FIGS. 2A-2C are example multicast trees in accordance with an embodiment of the present invention.
Figure 2B:
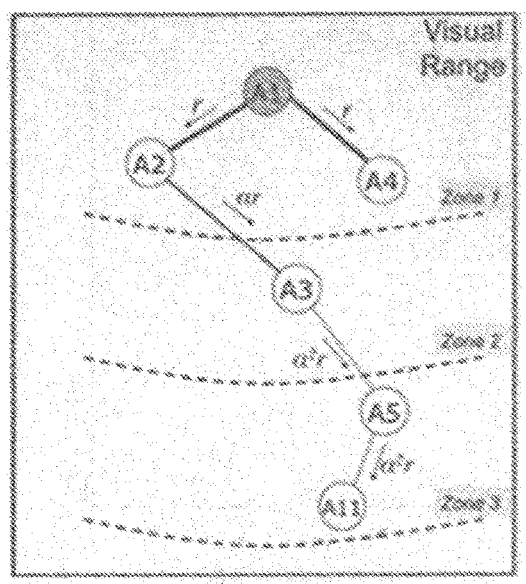

To clarify the following examples, it is assumed that the visual range of each participant can be divided into three zones (FIG. 2B). The highest bit rate for video is required when the recipient is within zone 1. Zone 2 and 3 require progressively lower bit rates for video transmission. This could be achieved by either using a multiple description coding scheme with three descriptions or a hierarchical layered coding. Hereafter, for clarity, a single parameter is used to model the bit rate reduction at successive zones. In other words, it is assumed that the video bit rate is reduced by a factor of a as a recipient moves from zone 1 to 2 or from zone 2 to 3, where $\alpha \leq 1$. Experimental results were obtained for a large number of 'talking head' videos encoded using the main profile of H.264 (a video coding scheme developed by the International Telecommunication Union (ITU)). For the variations in video quality of interest, it was observed that $\alpha \approx 0.65$ is a good approximation of the achievable bit rate reduction rates.

The Multicast Tree Formation Schemes

FIG. 2A shows the case of creating the shortest path multicast tree using the physical separation between the peers as the cost metric. Most existing peer-to-peer algorithms for multicast adopt this approach. The peers may use a number of algorithms to approximate the physical proximity, such as direct probing of the communication delay or reference measurements with respect to well-known landmarks. For best results, such information should be made available to every peer and kept consistent.

Without any additional algorithms to take the QoS differentiation into account, there may be some transmission capacity wastage. For example, although P5 is in Zone 3 with respect to P1 and would require video bit rate of $\alpha 2r$, it must download at full rate because it is on the path to other peers that require higher quality content.

In contrast, FIG. 2B depicts the case where the multicast tree is constructed based on the arrangement of peers in the virtual scene, using the virtual distance between the avatars as the primary 'cost' metric. The advantage of this scheme is that as the multimedia content travels down the tree, more hops are traversed and delay increases. However, the virtual distance is also increasing, which means that the peer can tolerate longer delay with less perceptual impact.

For example, A2 and A4, who are the closest avatars to A1, receive the voice and video with minimal delay (direct overlay paths P1-P2 and P1-P4), while the path to A5 has three overlay hops (path P1-P2-P3-P5).

Perceptually, the three zones within the visual range are shown and a represents the bit rate reduction factor associated with video quality reduction from one zone to another impact of this delay may be less due to virtual separation of A1 and A5. Also, as video packets travel down the tree, the amount of information relayed at subsequent hops can be reduced, for example by relaying a smaller number of video layers or descriptions. QoS differentiation with respect to delay and bit rate, therefore, is a natural outcome of this approach; with little or no overhead.

The other, advantage of this approach is that there is no need to exchange topology information for the construction of trees. This is because the details of the virtual topology are already available to each peer through the exchange of state information to present a consistent virtual environment to everyone. This facilitates the development of distributed algorithms for the construction of multicast trees and their subsequent repair as a result of virtual movement or churn without any need for coordination among peers.

The key drawback of using the virtual distance as the basis of route optimization is that avatars that are close in the virtual environment may be physically far from each other leading to inefficient utilisation of transmission capacity. In the above example, the voice and video of A1 is sent to A2 and then A3 based on virtual proximity. Assume that P1 and P3 are in Australia and P2 is in UK. The fact that A1 content has to go to UK to reach A2 cannot be helped as these peers are in communication with each other. But the main concern is that A1 data has to come back from the UK to reach A3.

Figure 2C:
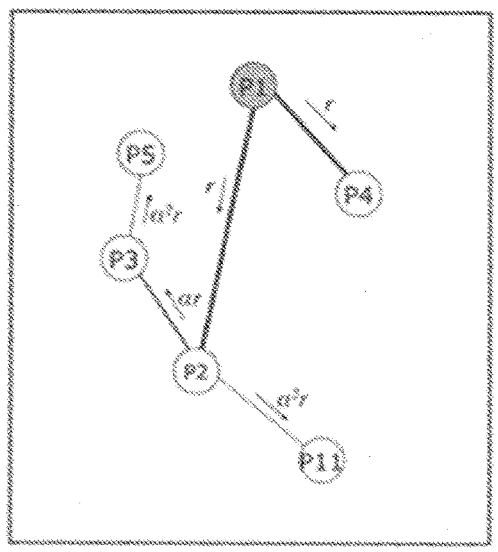

The third approach shown in FIG. 2C is a hybrid scheme to tackle the shortcomings of the previous two schemes. In this case, the physical distance is used to create the shortest path tree, but the algorithm is employed on three successive stages according the virtual zones. In the above example, first a shortest path tree is created between P1 and all the other peers who are in zone 1. This tree is then expanded to include peers in zone 2 in the second stage. At the final stage, peers in zone 3 will join the tree. The aim is to improve on QoS differentiation scheme without sacrificing the capacity utilization efficiency excessively.

For ease of reference, the three methods described above for multicast tree formation will be referred to as the 'physical', 'virtual' and 'hybrid' models respectively.

Example Results

To test the three methods described above, a simulation was setup to simulate a transit-stub network topology with three (3) transit and twenty four (24) stub domains each with eight (8) routers on average. The maximum delay between node pairs in this topology is around 380 ms, which is an indication of the geographical span of the network infrastructure. A total of 5000 peers are randomly connected to stub nodes. To simulate a small virtual crowd, at each run twenty (20) peers are picked from this pool and generate a random arrangement of the corresponding avatars in a rectangular shaped virtual environment of 200×200 size. Using this unit of measurement for size, the zone 1, 2, and 3 distances are assumed to be 50, 100, and 150 units respectively. Moreover the acceptable latency for communication within zones 1, 2, and 3 are set at 100, 200, and 400 ms respectively.

Two parameters are used to vary the key characteristics of interest. The first parameter is a as defined above. This parameter is the multiplying factor by which the bit rate of video can be reduced for zone 2 and 3 and, of course, will be dependent on the type of video coding used and the required video presentation quality. By varying this parameter in the range of [0.1, 1.0] the effectiveness of QoS differentiation with respect to bit rate can be modelled. In other words, $\alpha=1.0$ represents a case when no bit rate differentiation is possible across the communication zones while with $\alpha=0.1$ the bit rate of video is reduced by one and two orders of magnitude as zones 2 and 3 are crossed, respectively.

The second parameter, denoted by $\beta$, changes the geographical scale of the network. This is achieved by multiplying the delay of each network link by this factor. As stated before, the maximum delay between node pairs in the original topology is around 380 ms. By changing $\beta$ in the range of [0.1, 5.0] a range of network scales associated with a typical city or state up to a global network can be simulated. Clearly, in a large-scale network the latency violations are more likely and the impact of any improper design with respect to delay control will become more apparent.

To generate the following results, ten (10) different physical network topologies are created, each with twenty (20) different node sets, where each node set includes twenty (20) avatars. Each point on the graph, therefore, is the result (e.g. average) of 200 simulation runs.

Transmission Efficiency

The first set of results show the effectiveness of the three multicast schemes ('physical', 'virtual', and 'hybrid') in reducing the upload capacity requirements of the peers and the total transmission cost for the dissemination of multipoint-to-multipoint video.

Figure 3A:
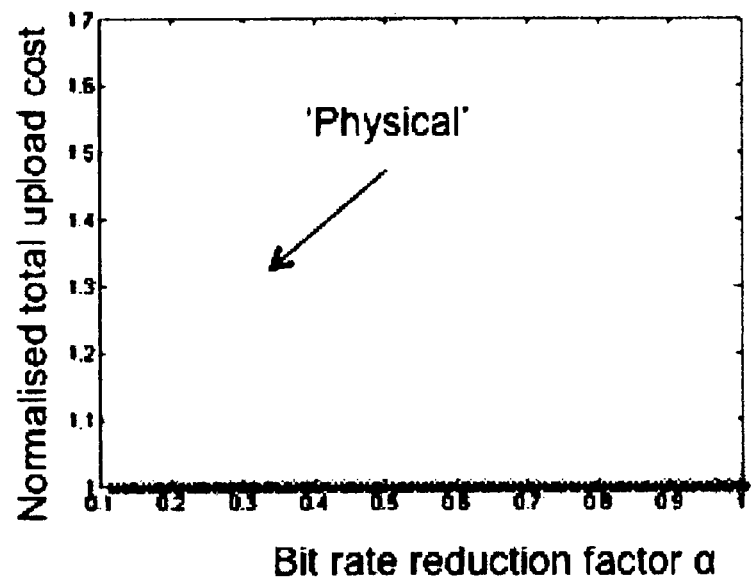
FIGS. 3A-3B are graphs representing the normalized cost of multicast schemes in accordance with an embodiment of the present invention.

In FIG. 3A the normalized total upload capacity cost is shown on the vertical axis. This cost is normalized with respect to the unicast scheme, which is shown in FIG. 1C. The horizontal axis is the range of values for parameter α from 0.1 to 1.0. It is clear from this graph that no peer-to-peer multicast scheme can improve the total upload capacity usage of peers compared to the unicast situation. Indeed when there is some opportunity for bit rate differentiation (α<1.0), the performance of the 'physical' multicast is even worse than the unicast by a significant margin.

This result can be explained as follows. For a single multicast, such as download of music files from a source, peer to-peer multicast is useful to reduce to upload cost on the source and distribute this load among all the participating peers. Even in this case, the total upload cost remains the same but each peer takes a share of this total, which improves the scalability. For the multipoint-to-multipoint content distribution scenario of interest to this paper, each peer is a source but also a relay node on other multicast trees. Each multicast tree will distribute the upload capacity of its source, but on the whole, the total remains the same and the average upload cost of the peers is not changed. In fact, this conclusion is true for any peer-to-peer multicast scheme including those that break the content into smaller blocks (e.g. BitTorrent) for distribution, because no assumptions were imposed about the granularity of packet sizes on our model.

The 'physical' multicast method performs worse than unicast for α<1.0 due to the inefficiency of this scheme in QoS differentiation as explained before (refer to FIG. 2A).

The only advantage of peer-to-peer multicast with respect to upload capacity criterion is that although the total is the same, the distribution of load among the peers is dependent on the way that the multicast trees are formed and the 'centrality' of a particular peer's position in those trees. In the simulations, while the unicast upload cost is distributed more or less uniformly, there is a significant variation among the peers in other schemes. With judicious design, this becomes an advantage, especially when there is heterogeneity among the peers. For example, some peers may perform the role of a super-peer and reduce the load on other, less capable, peers.

Figure 3B:
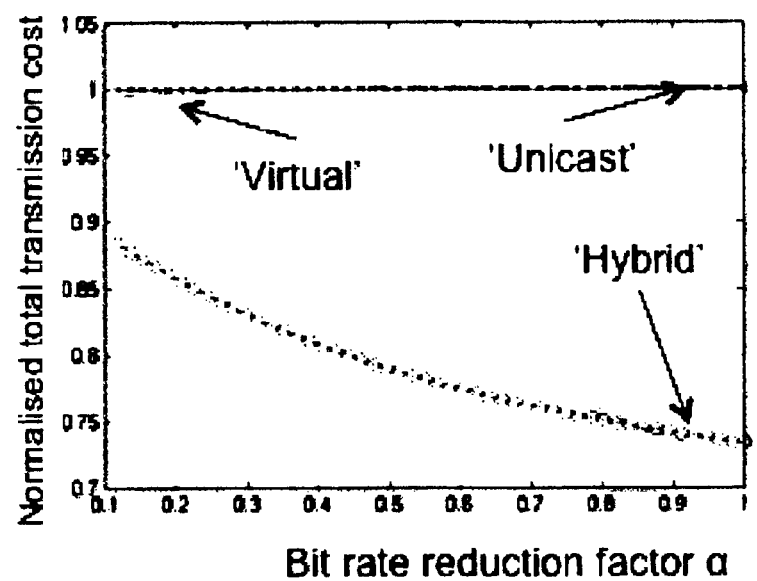

The graph in FIG. 3B shows that total transmission cost incurred by the underlying network infrastructure. This is defined as the bit rate used multiplied by the cost of the link (which in this case is proportional to the distance). It can be seen that both 'physical' and 'hybrid' methods result in a modest reduction in total transmission cost by using less of the high cost links. This benefit is higher when QoS differentiation with respect to bit rate, is not possible. As the opportunity for differentiation increases, the unicast performance will get very close to the multicast.

Latency Violations

As discussed earlier, the acceptable communication latency is dependent on the virtual distance. In the model described herein, three zones are utilized and the acceptable maximum delay for these zones are set at 100, 200, and 400 ms respectively. However, to be able to generalize the conclusions of this study, the geographical scale of the network is changed over a wide range, as shown on the horizontal axis in FIGS. 4A and 4B.

Figure 4A:
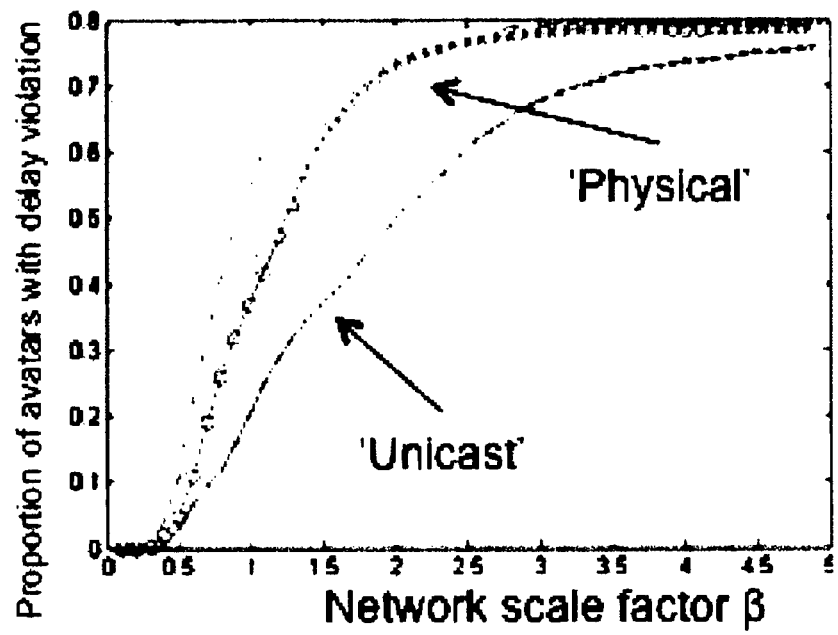
FIGS. 4A-4B are graphs representing delay violations and total excess delay experienced in a multicast network in accordance with an embodiment of the present invention.

FIG. 4A shows the proportion of interactive communication 'Connections' that exceed the acceptable latency. A communication connection encompasses any active multi-media exchange between two avatars that are in visual range of each other. As expected, by increasing the network size (parameter β) this number increases. For latency minimization, the best-case delivery method is the unicast scheme, which employs the shortest path route and a single overlay hop for video distribution. The 'physical' and 'hybrid' schemes perform progressively worse, and the 'virtual' multicast scheme the worst.

Figure 4B:
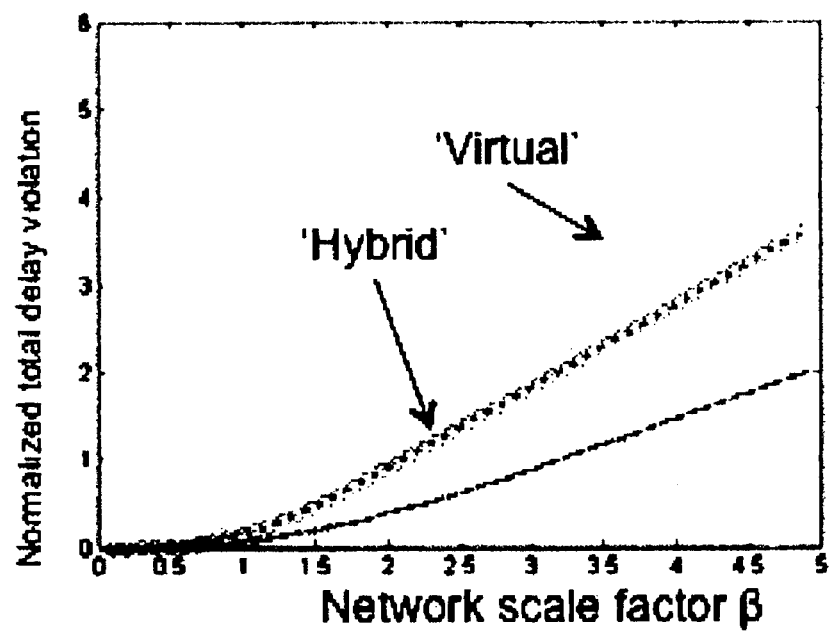

It is also important to assess the degree of latency violation experienced. In FIG. 4B one possible metric for this purpose is shown. This metric represents the sum total of excess latency incurred normalized with respect to the acceptable level. Although in isolation, this metric may not translate to a physically intuitive measure, it is useful as a comparative tool. As shown in FIG. 4B, the gap between the various schemes is an indication of the relative performance with respect to latency control.

CONCLUSION

The need for natural communication between members of a virtual crowd, in addition to current tools such as chat and email, is likely to grow as users expect more interactive and realistic multimedia experiences: There is a significant nascent demand for multipoint-to-multipoint multimedia communication services.

Peer-to-peer multicast is a popular technology for content delivery. However, the benefits of these schemes for the delivery of multipoint-to-multipoint multimedia communication are rather marginal.

In most cases, the simpler unicast method is equivalent and often outperforms overlay multicast. In the absence of an IP layer support for multicast, 'Area of Interest' management and QoS differentiation are tools which are more effective in reducing the capacity requirement of the service delivery.

One benefit of overlay multicast is the ability to distribute the upload cost among the peers in a non-uniform way to take advantage of heterogeneity among the peers. In such cases, the multicast scheme may present some benefits but at the cost of increased latency and more complex control system to establish and repair the trees.

In other words, utilizing a mixture of techniques, and utilizing the hybrid model described above, there can be provided a more effective methodology for transferring data across a plurality of connected computing systems. Such a methodology finds use in the burgeoning market for social networking and multiple user virtual environments.

Alterations and Modifications to the Embodiments

It will be understood that further services may be added to the embodiments described herein without departing from the broader invention which is disclosed herein. For example, the software application may also be arranged to interact with other software applications on other computing systems not shown. Embodiments may also find application in mobile computing devices including mobile telephones. Such variations and modifications are within the purview of a person skilled in the art.

In one embodiment, the software application may be an application arranged to operate on a central server or servers. The application may be accessed from any suitable remote terminal, through a public or private network, such as the Internet.

Where the software application interfaces with another computing system and/or a database, the data may be communicated via any suitable communication network, including the Internet, a proprietary network (e.g. a private connection between different offices of an organisation), a wireless network, such as an 802.11 standard network, or a telecommunications network (including but not limited to a telephone line, a GSM, CDMA, EDGE or 3G mobile telecommunications network, or a microwave link).

It will also be understood that the embodiments described may be implemented via or as an application programming interface (API), for use by a developer, or may be implemented as code within another software application. Generally, as software applications include routines, programs, objects, components, and data files that perform or assist in the performance of particular functions, it will be understood that a software application may be distributed across a number of routines, objects and components, but achieve the same functionality as the embodiment and the broader invention claimed herein. Such variations and modifications would be within the purview of those skilled in the art.

The foregoing description of the exemplary embodiments is provided to enable any person skilled in the art to make or use the present invention. While the invention has been described with respect to particular illustrated embodiments, various modifications to these embodiments will be readily apparent to those skilled in the art, and the generic principles defined herein may be applied to other embodiments without departing from the spirit or scope of the invention.

The present embodiments are, therefore, to be considered in all respects as illustrative and not restrictive.

The claims defining the invention are as follows:

1. A method for transferring video data between two or more computing systems in a multi-party conference connected over a communications network, the method comprising the steps of:
    establishing a network connection by a first computing system with at least one further computing systems to establish the multi-party conference between the two or more computing systems;
    generating a virtual environment and generating a plurality of avatars in the virtual environment, each of the plurality of avatars being associated with a computing system in the multi-party conference, each of the plurality of avatars signifying a virtual representation of the computing system and being defined by the video data;
    receiving, at the first computing system, state information representing coordinates of a further avatar representing the at least one further computing systems in the virtual environment;
    utilizing the state information to determine a virtual distance between an avatar representing the first computing system and the further avatar representing the at least one further computing systems in the virtual environment;
    determining a physical distance between the first computing system and the at least one further computing systems;
    for the first computing system, dividing the virtual environment into at least two virtual zones, virtual zones defined by the virtual distance from the avatar associated with the first computing system in the virtual environment;
    for the first computing system, creating a multicast tree structure defining a path for transferring the video data between the two or more computing systems in the multi-party conference and quality of the video data required for transfer, the multicast tree structure utilizing the virtual distance and the physical distance between computing systems, the multicast tree structure being created by the steps of:
        identifying computing systems within a first, closest, virtual zone and creating a path tree for the identified computing systems in dependence on the physical distance between the identified computing systems and the first computing system, and
        identifying computing systems within a second, further, virtual zone and expanding the path tree in dependence on the physical distance between the identified computing systems and the first computing system; and
    distributing the video data from the first computing system to further computing systems according to the multicast tree structure, wherein the video data is distributed to the computing systems in the first zone at a higher bitrate than to the computing systems in the second zone, wherein a single parameter is used to model bit rate reduction at successive zones.

2. A computing system for transferring video data to at least one further computing systems in a multi-party conference connected over a communications network, the computing system comprising:
    networking hardware suitable for establishing a network connection by the computing system with at least one further computing systems to establish the multi-party conference between computing systems;
    a hardware processor configured for generating a virtual environment and generating a plurality of avatars in the virtual environment, each of the plurality of avatars representing one of the computing systems in the multi-party conference, each of the plurality of avatars signifying a virtual representation of one of the computing systems and being defined by the video data;
    a receiving module, executing by the hardware processor, for receiving state information representing coordinates of a further avatar representing the at least one further computing systems in the virtual environment;
    the hardware processor further configured to:
        utilize the state information to calculate a virtual distance between an avatar representing the computing system and the further avatar representing the at least one further computing systems in the virtual environment;
        determine a physical distance between the computing system and the at least one further computing systems;
        for the computer system, divide the virtual environment into at least two virtual zones, virtual zones defined by the virtual distance from the avatar associated with the computing system in the virtual environment;
        for the computer system, create a multicast tree structure defining a path for transferring the video data between the computing systems in the multi-party conference and quality of the video data required for transfer, the multicast tree structure utilizing the virtual distance and the physical distance between the computing systems, the multicast tree structure being created by the steps of:
            identifying computing systems within a first, closest, virtual zone and creating a path tree for the identified computing systems in dependence on the physical distance between the identified computing systems and the computing system, and identifying computing systems within a second, further, virtual zone and expanding the path tree in dependence on the physical distance between the identified computing systems and the computing system; and
a hardware transmitter configured for distributing the video data from the computing system to further computing systems according to the multicast tree structure, wherein the video data is distributed to the computing systems in the first zone at a higher bitrate than to the computing systems in the second zone, wherein a single parameter is used to model bit rate reduction at successive zones.

* * * * *